(12) United States Patent
Chikaraishi

(10) Patent No.: US 7,360,457 B2
(45) Date of Patent: Apr. 22, 2008

(54) ELECTRIC POWER STEERING DEVICE

(75) Inventor: Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/517,659

(22) PCT Filed: May 28, 2003

(86) PCT No.: PCT/JP03/06639

§ 371 (c)(1),
(2), (4) Date: Feb. 8, 2006

(87) PCT Pub. No.: WO2004/009424

PCT Pub. Date: Jan. 29, 2004

(65) Prior Publication Data

US 2006/0191356 A1    Aug. 31, 2006

(30) Foreign Application Priority Data

Jul. 24, 2002   (JP) ............................. 2002-215074

(51) Int. Cl.
*G01L 3/14*   (2006.01)
(52) U.S. Cl. ................................. 73/862.322
(58) Field of Classification Search ............ 73/862.322
See application file for complete search history.

(56) References Cited

U.S. PATENT DOCUMENTS 5,739,616 A * 4/1998 Chikaraishi et al. ........ 310/194
5,796,014 A * 8/1998 Chikaraishi et al. ... 73/862.331
6,301,975 B1 * 10/2001 Chikaraishi ............ 73/862.331
2005/0155811 A1 * 7/2005 Chikaraishi ................. 180/444

FOREIGN PATENT DOCUMENTS

| DE | 195 21 531 A1 | 12/1995 |
| DE | 102 60 261 A1 | 4/2004 |
| JP | 9-101212 A | 4/1997 |
| JP | 11-248561 A | 9/1999 |
| JP | 2000-193541 A | 7/2000 |
| JP | 2000-313346 A | 11/2000 |
| JP | 2001-50828 A | 2/2001 |
| JP | 2001-85094 A | 3/2001 |
| JP | 2001-88719 A | 4/2001 |
| JP | 2001-108024 A | 4/2001 |

* cited by examiner

*Primary Examiner*—Michael Cygan
*Assistant Examiner*—Octavia Davis
(74) *Attorney, Agent, or Firm*—Sughrue Mion, PLLC

(57) ABSTRACT

The present invention relates to an electric power steering device provided with a torque sensor for detecting a torque using coil windings arranged in the inside of an electromagnetic yoke. The electric power steering device comprises coil bobbins which are housed in the inside of the electromagnetic yoke; a terminal block which projects a portion of the coil bobbins outwardly; and connection pins which are formed on the terminal block in a projecting manner. Further, the connection pins comprise connection members for connecting the connection pins to a sensor circuit substrate and the connection pins are arranged not to be covered and concealed with the sensor circuit substrate.

2 Claims, 9 Drawing Sheets

ELECTRIC POWER STEERING DEVICE

TECHNICAL FIELD

The present invention relates to a torque sensor of an electric power steering device which detects a torque generated on a rotary shaft, and more particularly to an improvement of a connection member connecting coil windings and a sensor circuit substrate.

BACKGROUND OF THE INVENTION

On a vehicle, an electric power steering device is used for reducing a fatigue of a driver and for ensuring a safe driving. The electric power steering device is configured to apply a driving force of a motor as an auxiliary load to a steering shaft by a transmission mechanism such as gears via a reduction gear.

Here, the schematic structure of the steering system of the electric power steering device is shown in FIG. 12, for example. In the drawing, a steering shaft 51 is rotatably supported in-the inside of a steering column 52, while on a radical-end side (left side in FIG. 12) thereof, an input shaft 54 and an approximately cylindrical output shaft 55 are connected to each other via a torsion bar 53. The torsion bar 53 is inserted into the inside of the output shaft 55. One end of the torsion bar 53 is press-fitted into and fixed to the input shaft 54, and the other end is fixed to the output shaft 55 using a pin 56.

Further, a reduction gear unit 57 is supported on an outer periphery of the output shaft 55 via a pair of ball bearings 58, 58. The reduction gear unit 57 is constituted of: a worm wheel 59 mounted on an outer periphery of the output shaft 55; a worm 60 meshed with the worm wheel 59; and a motor mounts the worm 60 on a rotor shaft 61 thereof, wherein the reduction gear unit 57 transmits a torque by reducing the rotation of the motor.

Further, on a leading-end side (right side in FIG. 12) of the reduction gear unit 57, a torque sensor 62 which detects a torque based on a twisting angle generated by the torsion bar 53 is arranged. The torque sensor 62 is configured such that an approximately cylindrical sleeve 64 which is brought into contact with the input shaft 54 is arranged on an outer periphery of a spline groove 63 formed on a leading-end of the output shaft 55, and an electromagnetic yoke 65 and a coil bobbin 67 which has a coil winding 66 wound in the inside of the electromagnetic yoke 65 are arranged on an outer periphery of the sleeve 64.

In the coil bobbin 67, a terminal block 68 extends in the radial direction and in the axially outward direction, and metallic connection pins 69 are formed on the terminal block 68 in a projecting manner. Here, the connection pins 69 are configured such that an end portion of the coil winding 66 is entangled with the connection pins 69, the connection pins 69 are immersed in a solder bath, and a coating material on the end portion of the coil winding 66 is melted to make the coil winding 66 and the connection pins 69 conductive with each other.

Then, a sensor-housing 70 is formed above the torque sensor 62. In the inside of the sensor-housing 70, a sensor circuit substrate 71 is housed. As shown in FIG. 13, four through holes 72 are formed in the sensor circuit substrate 71, the through holes 72 respectively allow the connection pins 69 to pass therethrough, and the coil winding 66 and a control circuit of the sensor circuit substrate 71 are connected to each other via the connection pins 69 by soldering.

However, in the above-mentioned structure, when the sensor circuit substrate 71 is assembled into the inside of the sensor-housing 70, there arises a state in which the sensor circuit substrate 71 is arranged above the connection pins 69 and the soldered portions of the connection pins 69 on a back side of the sensor circuit substrate 71 cannot be observed at all.

Accordingly, with respect to the evaluation of the soldering, the soldering is performed under various conditions, the evaluation criteria are preliminarily prepared based on the data of the soldering, and the evaluation of the actual soldering is performed based on the evaluation criteria. For example, to evaluate the soldered state, the sensor-housing 70 is cut and the actual soldering state is evaluated based on the evaluation criteria in view of the soldered state of a confirmed surface (a fillet shape or the like).

However, even when the evaluation criteria for soldering are preliminarily prepared, unless the soldered portion on the back side of the sensor circuit substrate 71 is observed, the soldered state cannot be accurately determined. Accordingly, there exists a possibility that the soldering becomes insufficient and hence, the reliability of soldering is low thus giving rise to a possibility that, for example, the connection pins 69 are turned down or the connection pins 69 are misaligned with the through holes 72 thus leading to the conductive failure. That is, a person who actually operates cannot observe the soldered portion with his naked eyes and hence, there has been a drawback that it is difficult to ensure a given allowable level with respect to the reliability of soldering. Accordingly, it is necessary to check the conduction by exercising a given vibration test and a given heat cycle test in the manufacturing steps with respect to all soldering finished products thus giving rise to the increase of a cost.

SUMMARY OF THE INVENTION

Accordingly, it is an object of the present invention to enhance the reliability of soldering or to reduce a manufacturing cost by connecting connection pins and a sensor circuit substrate using connection members so as to easily confirm a state of soldered portions between the connection pins and the sensor substrate.

The above-mentioned object of the present invention can be achieved by an electric power steering device which comprises a torque sensor which detects a torque using coil windings arranged in the inside of an electromagnetic yoke, wherein the electric power steering device further comprises at least one coil bobbin which is housed in the inside of the electromagnetic yoke; a terminal block from which a portion of the coil bobbin projects outwardly; connection pins which are formed on the terminal block in a projecting manner; and connection members which serve for connecting the connection pins to the sensor circuit substrate, thus preventing the connection pins from being covered and concealed with the sensor circuit substrate.

Further, the above-mentioned object can be effectively achieved by arranging the sensor circuit substrate at an angle which is not parallel to an axis of the coil bobbin.

Further, the above-mentioned object can be effectively achieved by integrally forming the connection members with a conductive plate which connects the connection pins and the sensor circuit substrate with resin.

Further, the above-mentioned object can be effectively achieved by forming the connection members by projecting a portion of the sensor circuit substrate in an arm shape.

Description of reference symbols:

| | |
|---|---|
| 12 | torque sensor |
| 15 | coil unit |
| 16 | electromagnetic yoke |
| 17 | coil bobbin |
| 18 | terminal block |
| 19 | connection pin |
| 20 | coil winding |
| 22 | sensor circuit substrate |
| 25 | connection member |
| 26 | bracket |
| 27 | conductive plate |
| 32 | arm-shaped member |

DESCRIPTION OF THE PREFERRED EMBODIMENTS

Embodiments of the present invention will be explained hereinafter in conjunction with drawings.

Figure 1:
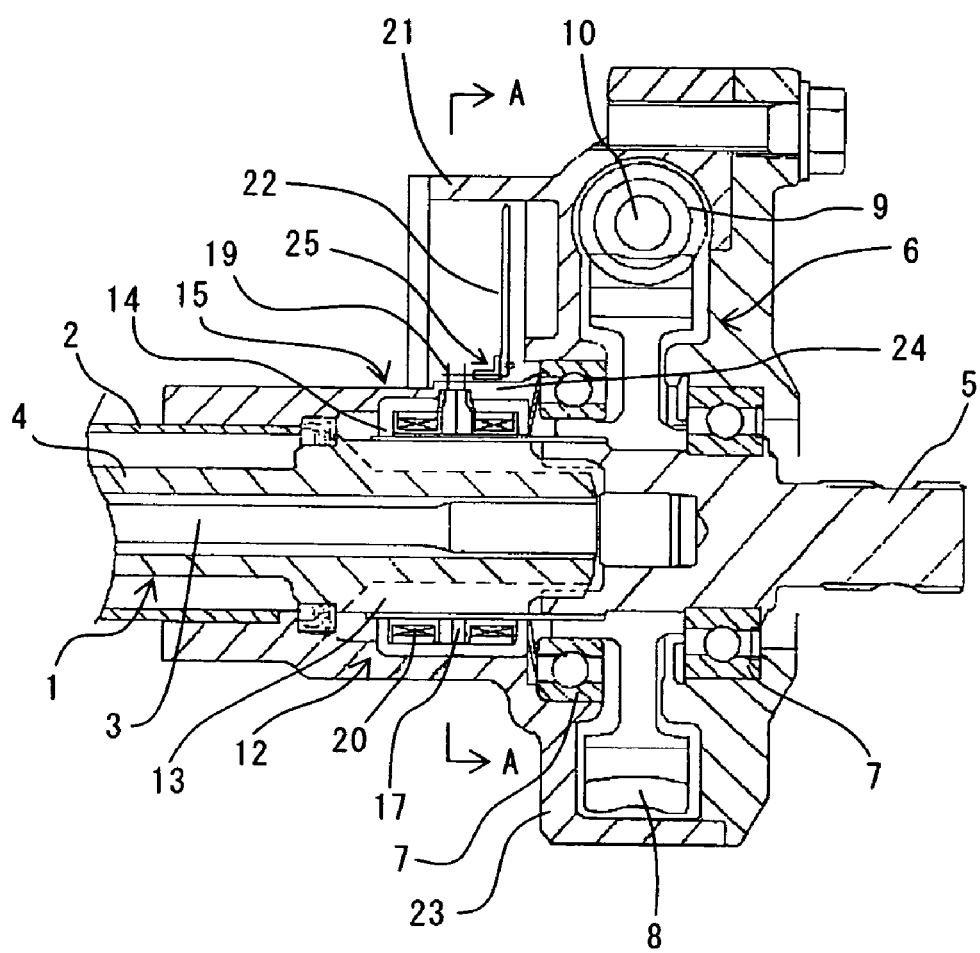
FIG. 1 is a cross-sectional view of the schematic structure of the vicinity of a torque sensor of an electric power steering device according to a first embodiment of the present invention.
Figure 2:
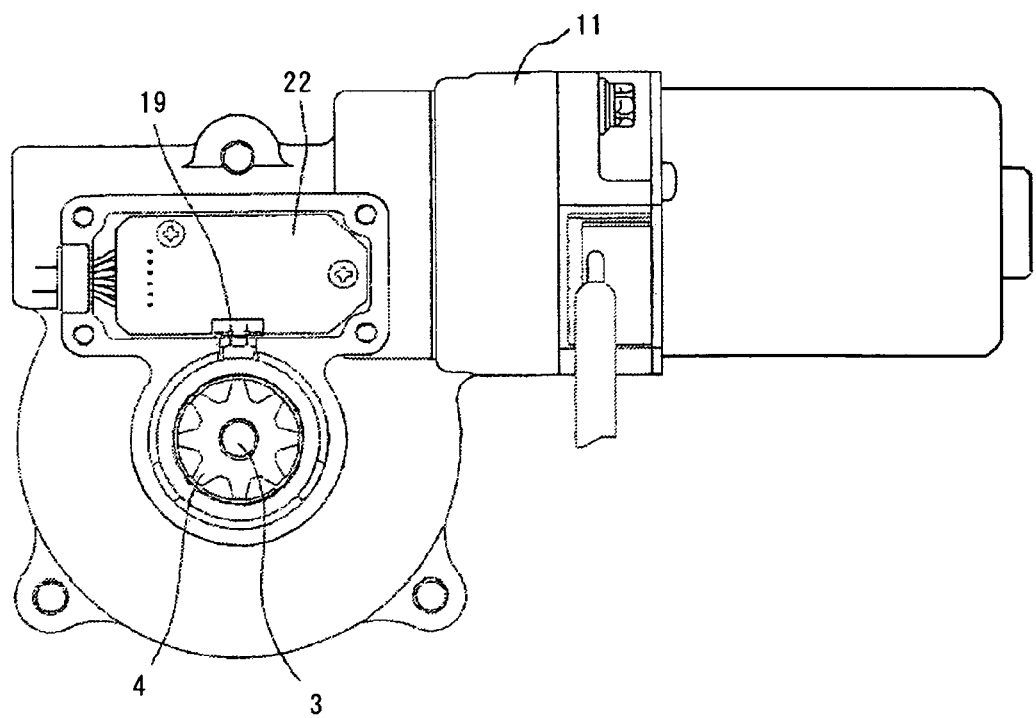
FIG. 2 is a view as viewed in the direction A-A in FIG. 1.

FIG. 1 and FIG. 2 show the schematic structure of an electric power steering device according to a first embodiment of the present invention, wherein a steering shaft 1 is rotatably supported on a steering column 2. On a radical-end side (right side in FIG. 1) of the steering shaft 1, an approximately cylindrical input shaft 4 and an output shaft 5 which are connected to each other using a torsion bar 3 are provided.

On an outer periphery of the output shaft 5, a reduction gear unit 6 is supported using a pair of ball bearings 7, 7. The reduction gear unit 6 comprises a worm wheel 8 which is fixedly mounted on the outer periphery of the output shaft 5 by press-fitting; a worm 9 which is meshed with the worm wheel 8; and an electrically-operated motor 11 which has the worm 9 mounted on a rotor shaft 10 thereof, wherein upon driving of the electrically-operated motor 11, the torque is transmitted by reducing the speed of the rotation of the electrically-operated motor 11 via the worm 9 and the worm wheel 8.

Further, on a leading-end side (left side in FIG. 1) of the reduction gear unit 6, a torque sensor 12 is arranged. The torque sensor 12 comprises a torsion bar 3; an approximately cylindrical sleeve 14 which is arranged on an outer periphery of spline grooves 13 formed in the input shaft 4 and is brought into contact with the output shaft 5; and a coil unit 15 which is arranged on an outer periphery of the sleeve 14. The torque sensor 12 detects a magnetic change in response to a phase difference between the spline groove 13 and a window formed in the sleeve 14, the magnetic change being generated due to twisting of the torsion bar 3, using coils of the coil unit 15.

Figure 3:
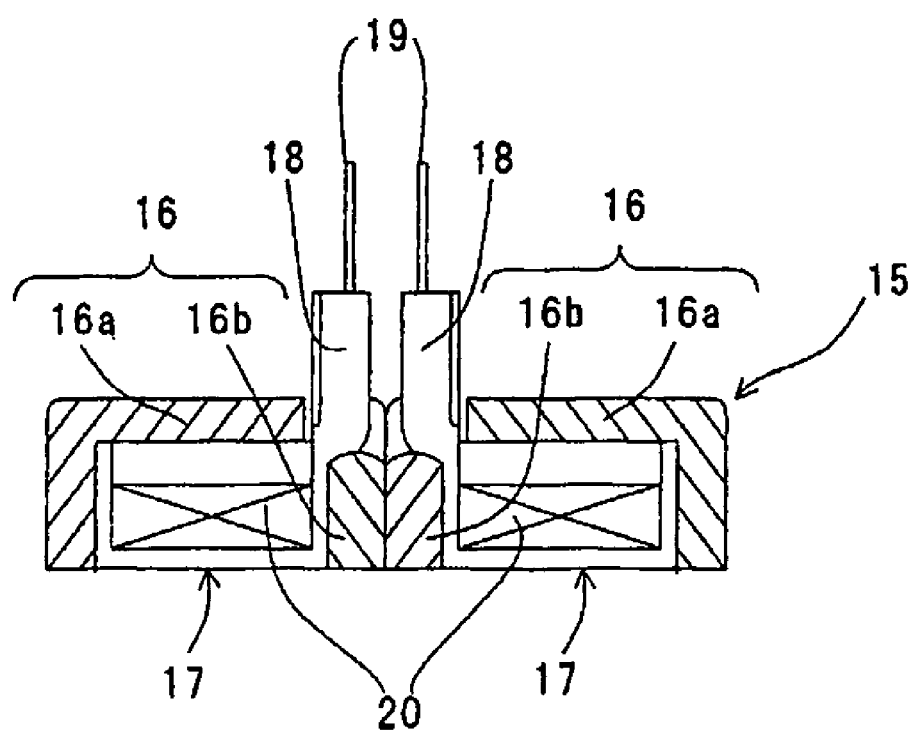
FIG. 3 is a cross-sectional view showing the schematic structure of a coil unit.

The coil unit 15 comprises, as shown in FIG. 3, a pair of electromagnetic yokes 16, 16 and coil bobbins 17 which are housed in the inside of the respective electromagnetic yokes 16. Each electromagnetic yoke 16 is formed of an approximately cylindrical member having a U-shaped cross section which has an inner side thereof opened in the radial direction, and is constituted of a yoke member 16a having an L-shaped cross section which forms a peripheral surface and one side surface and a yoke member 16b which forms another side surface.

Further, the coil bobbin 17 is formed by injection molding of resin and is formed of an approximately cylindrical member having a U-shaped cross section which has a radially outside thereof opened, and a terminal block 18 having an approximately rectangular solid shape extends radially outwardly and axially outwardly in the coil bobbin 17. Further, a pair of metallic connection pins 19, 19 are fixedly mounted on the terminal block 18 and respective end portions of the coil windings 20 which are wound around the coil bobbins 17 are entangled with and fixed to the respective connection pins 19.

Further, the connection pins 19, a sensor-housing 21 is formed close to the reduction gear unit 6 and the sensor circuit substrate 22 is housed in the inside of the sensor-housing 21. Here, the coil unit 15 is mounted in the inside of a housing 23 along the axial direction, while the connection pins 19 project into the inside of the sensor-housing 21 through notches 24 formed in the housing 23.

Figure 4:
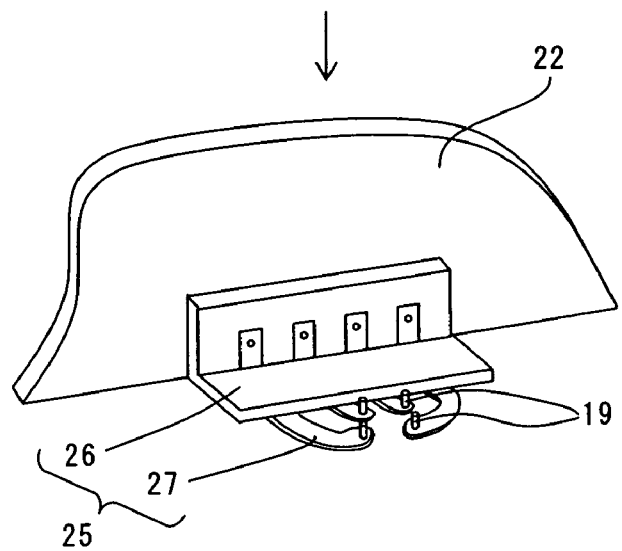
FIG. 4 is a view showing a mounted state of a connection member which connects connection pins and a sensor circuit substrate.
Figure 5:
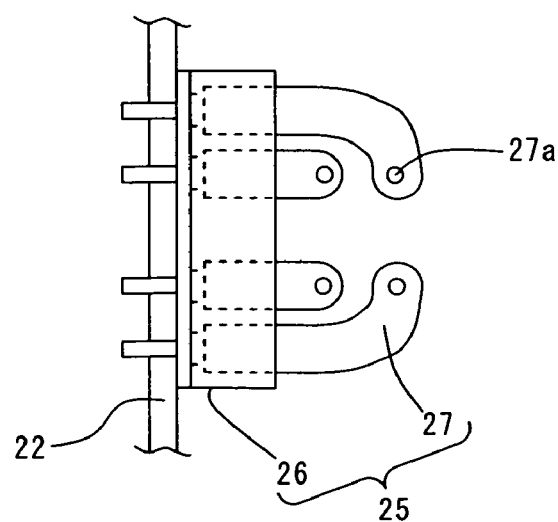
FIG. 5 is a plan view showing the connection member as viewed in an arrow direction in FIG. 4.
Figure 6:
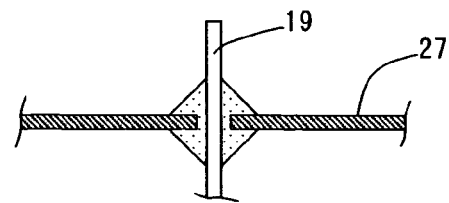
FIG. 6 is a view for explaining a normal soldered state.

Further, as shown in FIG. 4, the sensor circuit substrate 22 is arranged perpendicular to the axis of the coil bobbins 17, and arranged parallel to four connection pins 19 which project from the terminal block 18, wherein the connection pins 19 and the sensor circuit substrate 22 are connected to each other by a connection member 25. As shown in FIG. 5, the connection member 25 is constituted of a bracket 26 having an L-shaped cross section which is mounted on a lower end portion of the sensor circuit substrate 22 and four conductive plates 27 which extend from the bracket 26, wherein the conductive plates 27 are integrally formed with the bracket 26 using resin. Further, in one end of each conductive plate 27, a small hole 27a is formed, the connection pin 19 penetrates the small hole 27a and, as shown in FIG. 6, the connection pin 19 is fixed to the conductive plate 27 by soldering. Due to such a constitution, the connection pins 19 are connected to the sensor circuit substrate 22 via the conductive plates 27 and hence, the coil winding 20 is made conductive with the sensor circuit substrate 22 via the connection pins 19 and the connection member 25.

Figure 7:
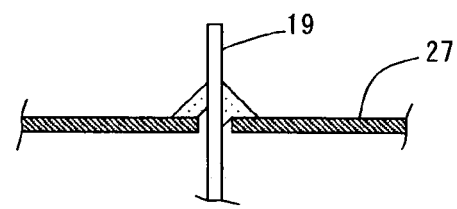
FIG. 7 is a view for explaining an insufficient soldered state.

In this manner, according to the above-mentioned first embodiment, the sensor circuit substrate 22 is arranged with an angle which is not parallel to the axes of the coil bobbins 17 and also is arranged at a position where the soldered portions of the connection pins 19 are not covered and concealed with the sensor circuit substrate 22. Accordingly, an operator who performs soldering can observe the soldered state not only from an upper side of the conductive plate 27 but also from a lower side of the conductive plate 27. Therefore, for example, when the soldering between the connection pin 19 and the conductive plate 27 is insufficient as shown in FIG. 7, the operator or an inspector can actually confirm the insufficient soldered state with his naked eyes and can handle the product as a defective product. As a result, the reliability of soldering is enhanced and, at the same time, a conductivity check such as a vibration test, a heat cycle test or the like in the manufacturing steps becomes unnecessary and hence, a manufacturing cost can be reduced.

Figure 8:
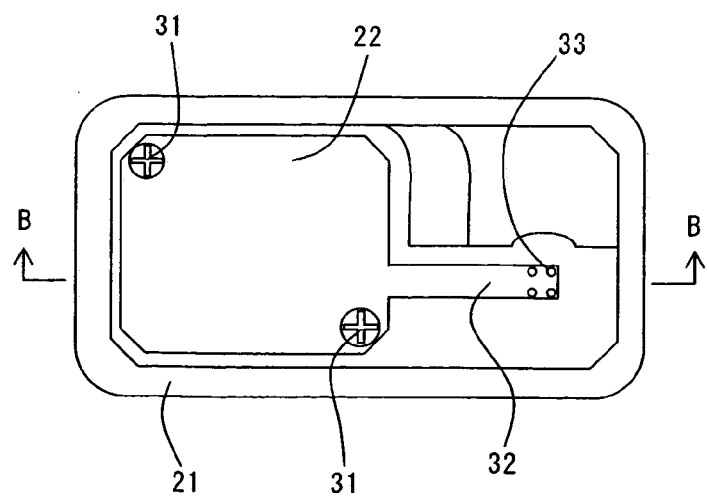
FIG. 8 is a view showing a mounted state of a sensor circuit substrate of an electric power steering device according to a second embodiment of the present invention.
Figure 9:
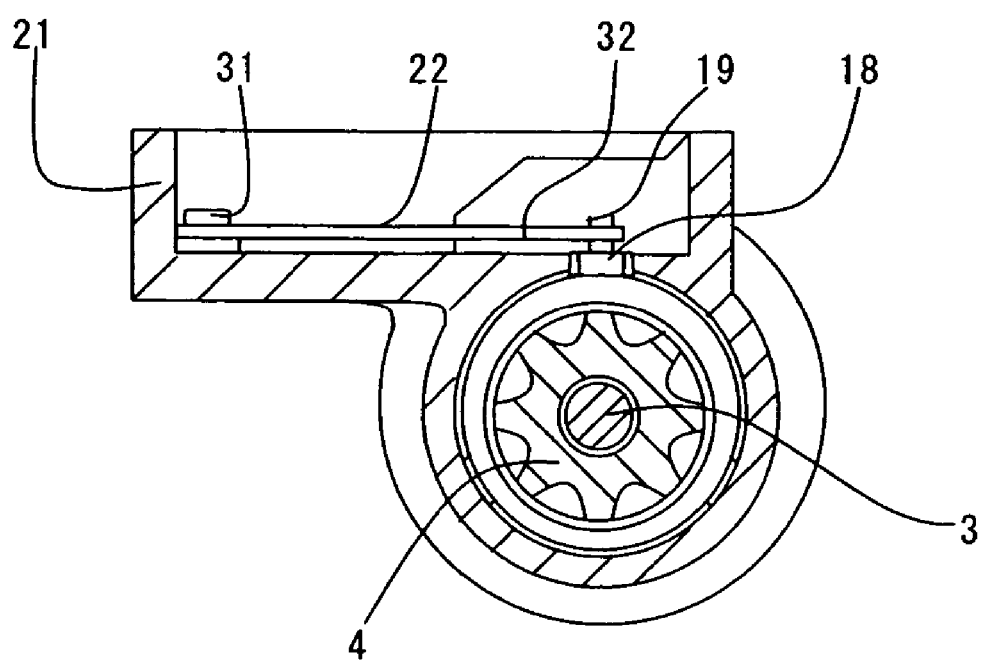
FIG. 9 is a view as viewed in the direction B-B in FIG. 8.

Next, FIG. 8 and FIG. 9 show a second embodiment of the present invention, wherein the identical parts as in the first embodiment are represented by the identical reference numerals and description will be omitted. In these drawings, a sensor circuit substrate 22 is fixed to a bottom surface of a sensor-housing 21 by fastening two screws 31. A portion of the sensor circuit substrate 22 forms an arm-shaped member 32 which projects in an arm shape. In the arm-shaped member 32, a conductor is integrally laminated to a resin-made board in the same manner as the circuit substrate 22. Further, four small holes 33 are formed in a leading-end of the arm-shaped member 32, connection pins 19 are allowed to pass through the respective small holes 33 and portions of the connection pins 19 at the small holes 33 are soldered. Due to such a constitution, the connection pins 19 and the sensor circuit substrate 22 are connected to each other via the arm-shaped members 32 which constitute the connection members and hence, coil windings 20 become conductive with the sensor circuit substrate 22 via the connection pins 19 and the arm-shaped members 32.

Accordingly, also in the second embodiment, the soldered portions of the connection pins 19 are arranged at positions which are not covered and concealed with the sensor circuit substrate 22 and hence, it is possible to obtain the manner of operation and advantageous effects similar to those of the above-mentioned first embodiment.

Figure 10:
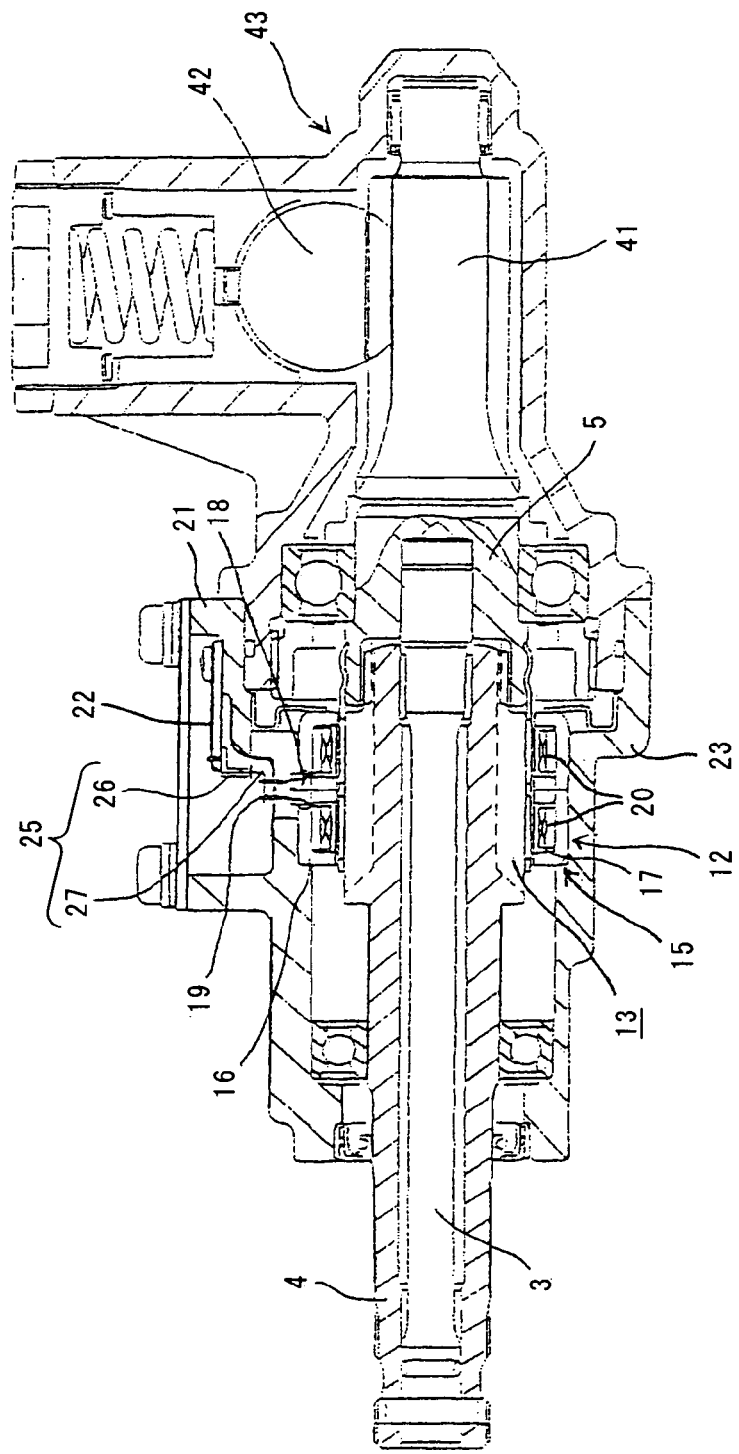
FIG. 10 is a cross-sectional view showing the schematic structure of the vicinity of a torque sensor of an electric power steering device according to a third embodiment of the present invention.
Figure 11:
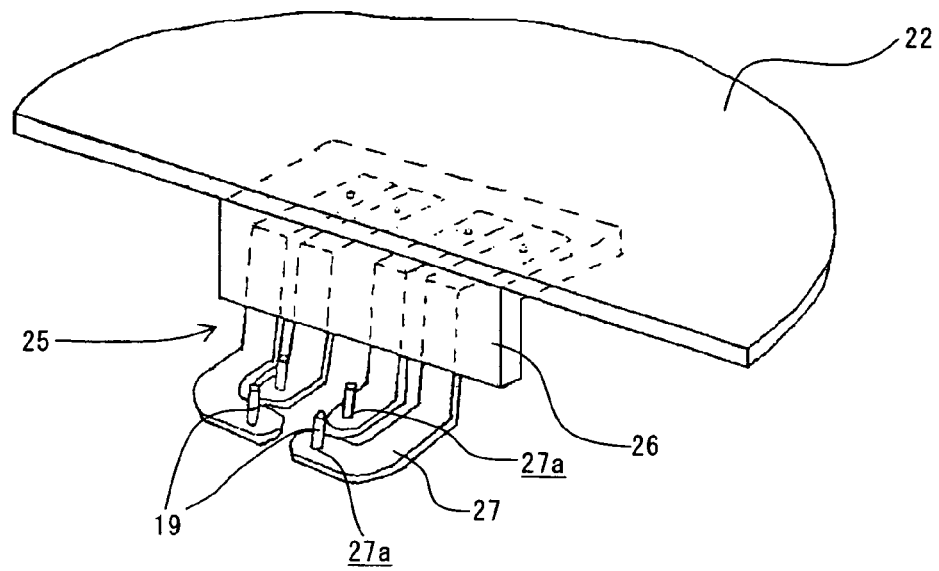
FIG. 11 is a view showing a mounted state of a connection member which connects connection pins and a sensor circuit substrate in the third embodiment.
Figure 12:
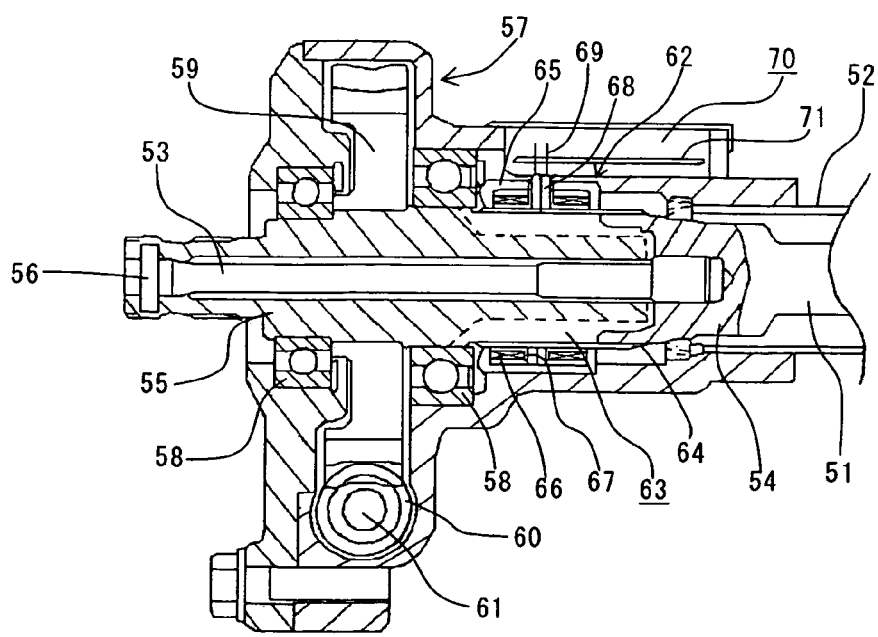
FIG. 12 is a cross-sectional view showing the schematic structure of the vicinity of a torque sensor of a conventional electric power steering device.
Figure 13:
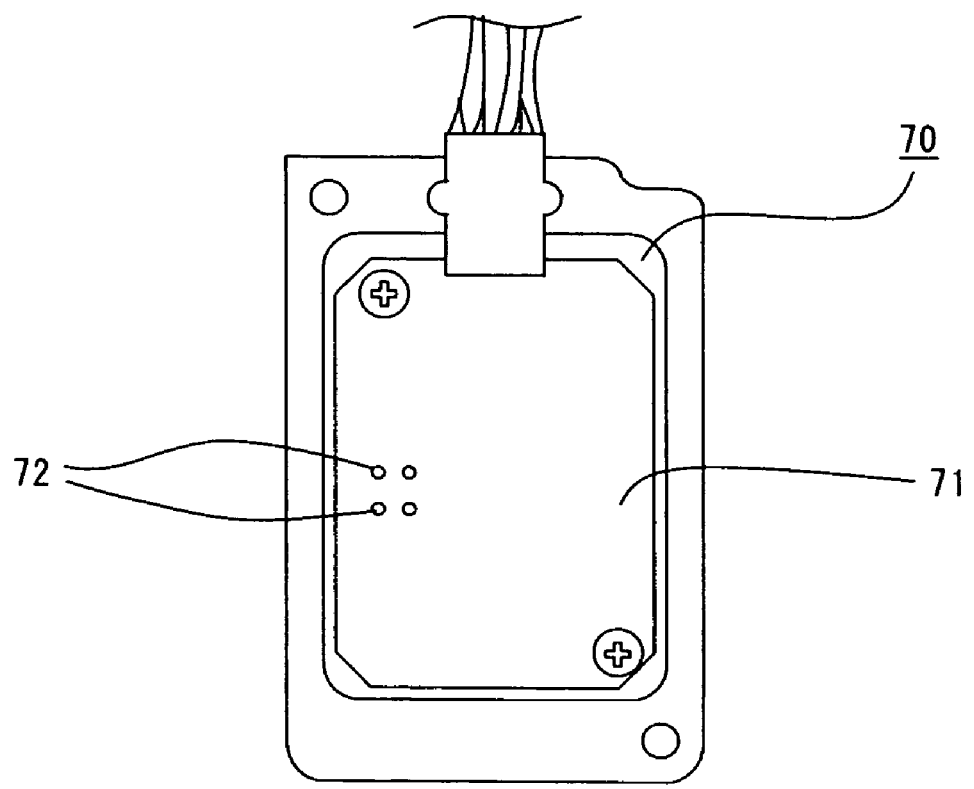
FIG. 13 is a plan view of a sensor-housing portion shown in FIG. 12 from above.

Further, FIG. 10 shows a third embodiment of the present invention, wherein the identical parts as in the first embodiment are represented by the identical reference numerals and description will be omitted. In the drawing, a sensor circuit substrate 22 is arranged parallel to axes of coil bobbins 17, is also arranged perpendicular to four connection pins 19 which project from a terminal block 18 and the connection pins 19 and the sensor circuit substrate 22 are connected to each other by connection members 25. As shown in FIG. 11, the connection member 25 comprises a bracket 26 having an L-shaped cross section which is mounted on a lower end portion of the sensor circuit substrate 22; and four conductive plates 27 which extend from the bracket 26, wherein the conductive plates 27 are integrally formed with the bracket 26 using resin. The conductive plate 27 is configured such that a lower end of an L-shaped thin plate is bent and extends in the direction perpendicular to the connection pins 19. Small holes 27a are formed in each the bent portion, the connection pins 19 are allowed to pass through the small holes 27a and the connection pins 19 are fixed to the conductive plate 27 by soldering. Accordingly, the connection pins 19 are connected to the sensor circuit substrate 22 via the conductive plates 27 and hence, coil windings 20 become conductive with the sensor circuit substrate 22 via the connection pins 19 and the connection member 25.

Here, in this third embodiment, as shown in FIG. 10, a following method is illustrated. That is, in the electric power steering device adopting the rack and pinion method, the rotation of an electrically-operated motor is transmitted through another rack and pinion mechanism, a ball screw mechanism or the like not shown in the drawing so as to assist a steering force. Here, numeral 41 indicates a pinion shaft and numeral 42 indicates a rack shaft 42, wherein these members constitute the rack and pinion mechanism 43 which converts the rotational motion to the linear motion.

Accordingly, even when the torque sensor and the assist mechanism are not integrally formed as in the case of this third embodiment, the soldered portions of the connection pins 19 are arranged at positions which are not covered and concealed with the sensor circuit substrate 22 and hence, it is possible to obtain the manner of operation and advantageous effects similar to those of the above-mentioned first embodiment.

Here, although the conductive plates 27 and the arm-shaped members 32 are used as connection members in the above-mentioned respective embodiments, the present invention is not limited to such constitutions and the present invention is applicable to any constitution provided that the sensor circuit substrate 22 is arranged at a position not covering and concealing the soldered state.

As has been described heretofore, according to the electric power steering device of the present invention, in the torque sensor for detecting the torque using the coil windings arranged in the electromagnetic yokes, the coil bobbins are housed in the inside of the electromagnetic yokes, a portion of the coil bobbin which projects outwardly is provided to the terminal block, the connection pins which project are formed on the terminal block, and using the connection members which connect the connection pins to the sensor circuit substrate to allow the coil windings to become conductive with the sensor circuit substrate via the connection pins, the soldered portions of the connecting pins are arranged at positions where the soldered portions are not covered and concealed with the sensor circuit substrate and can be observed with naked eyes. Accordingly, even when the connection pins are connected to the sensor circuit substrate using the connection members, it is possible to surely confirm with eyes whether the soldered portions of the connection pins form pure fillets on the upper side and the lower side which sandwich the sensor circuit substrate. As a result, when the soldered state is insufficient, the product having the insufficient soldered portion can be removed thus enhancing the reliability of soldering. Further, it is possible to omit the test for confirming the soldered state during the manufacturing steps and hence, the manufacturing cost can be reduced. Further, the sensor circuit substrate may be offset parallel to the axis of the coil bobbin or may be arranged with a suitable angle with respect to the axis of the coil bobbin. In short, so long as the sensor circuit substrate is arranged at a position where the connection pins are not covered and concealed with the sensor circuit substrate so that the soldered state can be surely inspected, the reliability of soldering can be enhanced.

What is claimed is:

1. An electric power steering device provided with a torque sensor for detecting a torque using coil windings arranged in an electromagnetic yoke, the electric power steering device comprising:
   at least one coil bobbin which is housed in the inside of the electromagnetic yoke;
   a terminal block which projects a portion of the coil bobbin outwardly;
   connection pins which are formed on the terminal block in a projected manner; and
   a connection member which extends from a sensor circuit substrate and conducts the connection pins with the sensor circuit substrate,
      wherein the connection pins are arranged not to be covered and concealed with the sensor circuit substrate.

2. An electric power steering device provided with a torque sensor for detecting a torque using coil windings arranged in an electromagnetic yoke, the electric power steering device comprising:
   at least one coil bobbin which is housed in the inside of the electromagnetic yoke;
   a terminal block which projects a portion of the coil bobbin outwardly;
   connection pins which are formed on the terminal block in a projected manner; and
   conductive plates which extend from a sensor circuit substrate and conduct the connection pins and the sensor circuit substrate,
   wherein the connection pins are arranged not to be covered and concealed with the sensor circuit substrate.

* * * * *